Figure 1:
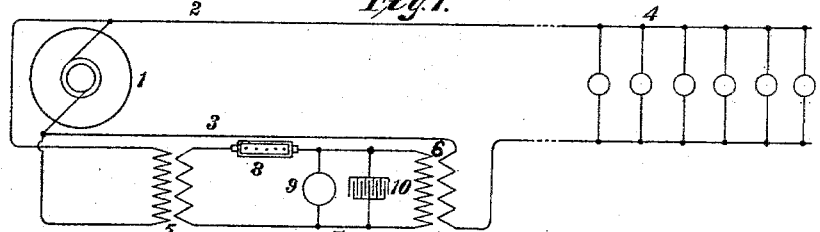

(No Model.)

R. D. MERSHON.
STATION POTENTIAL INDICATOR.

No. 571,839. Patented Nov. 24, 1896.

WITNESSES:

INVENTOR
R. D. Mershon
BY Terry, MacKaye & Carr
ATTORNEYS

THE NORRIS PETERS CO., PHOTO-LITHO., WASHINGTON, D. C.

UNITED STATES PATENT OFFICE.

RALPH D. MERSHON, OF PITTSBURG, PENNSYLVANIA.

STATION POTENTIAL-INDICATOR.

SPECIFICATION forming part of Letters Patent No. 571,839, dated November 24, 1896.

Application filed December 23, 1895. Serial No. 572,978. (No model.)

*To all whom it may concern:*

Be it known that I, RALPH D. MERSHON, a citizen of the United States, residing in Pittsburg, in the county of Allegheny and State of Pennsylvania, have invented a new and useful Improvement in Station Potential-Indicators, of which the following is a specification.

My invention relates to alternating electric current apparatus, and more particularly to means employed for indicating at the generating-station the potential at the load in an alternating-current circuit; and it has for its object to provide a method and means whereby the potential at the load may be approximately indicated at the generating-station whatever may be the drop in the line. In transmission-circuits of considerable length there is generally a large drop in potential between the generator and the load due to the resistance of the line, and also a considerable variation in drop due to the nature and amount of the load. Since it is necessary to regulate the generator in accordance with the potential desired at the load, it is extremely desirable that some means be employed at the generating-station which will indicate the potential at the load end of the circuit.

In order to accomplish the desired result, I provide at the generating-station a means for obtaining an electromotive force proportional to the electromotive force of the generator and one approximately proportional to the total counter electromotive force of the line and so combine these electromotive forces that the resultant electromotive force is approximately proportional to the electromotive force at the load end of the line, a suitable indicating device being employed and so located as to properly indicate the value of this resultant electromotive force. The electromotive force, which is approximately in step with and proportional to the counter electromotive force of the line, and which for convenience I will designate as the "miniature counter electromotive force," is obtained by means of a resistance which is either inductive or ohmic, according as the main-line resistance is mainly the one or the other, and which bears the proper relation to such main-line resistance. A current is caused to flow through this resistance, which for convenience I will designate as the "miniature current," and which is in step with and proportional to the current in the main line. This current may be the main-line current itself or it may be a current abtained from the secondary of a series converter through the primary of which the main-line current flows. The electromotive force in step with and proportional to the generator electromotive force, which I will designate as the "miniature impressed electromotive force," may be the generator electromotive force itself or it may be the electromotive force obtained from the secondary of a converter in shunt to the generator.

The series converter included in the line and the shunt-converter connected across the generator-terminals may both be employed, or one of them may be omitted, but in every case either the one or the other is necessary. The minature electromotive force corresponding to the resultant of those due to the resistance and self-induction of the line must bear approximately the same ratio to the miniature impressed electromotive force that the corresponding quantity of the main line bears to the generator electromotive force, this approximation being easily obtained by properly adjusting the value of the miniature resistance with respect to that of the current flowing through it.

In Patent No. 551,982, granted to me December 24, 1895, I have described and claimed a method and means whereby the potential at the load in an alternating-current circuit may be accurately indicated whatever may be the phase relation between the current and impressed electromotive force.

In my application above referred to I have set forth and claimed a method of and means for reproducing locally the ohmic and inductive electromotive forces and the impressed electromotive force of the main line, whatever may be their respective values, compounding such electromotive forces and indicating the value of their resultant.

While an accurate indication necessitates the production in the local circuit of electromotive forces which shall be proportional to the impressed and counter electromotive forces of the line, I have found that an approximate indication of the potential at the load may be secured by compounding electromotive forces which are not exactly proportional to those of the main line. That is to say, I may employ, in connection with a circuit having a small amount of self-induction and a large amount of ohmic resistance, a local circuit having an ohmic resistance only, and, on the other hand, I may employ, in connection with circuits having large self-induction and relatively small ohmic resistance, a local circuit having an inductive resistance only, and still secure an approximate indication of the potential at the load which may be sufficiently accurate for certain conditions of working. I still regard it as necessary, however, to provide the local circuit with resistances corresponding in kind as well as in degree to those of the main line in order to secure the best possible results. In my former invention the inductive resistance of the local circuit might in certain cases have zero value, but only in cases where there was no inductive drop in the main line. By my present invention I may employ an ohmic resistance only in the local circuit even though there be some inductive drop in the line.

Figure 2:
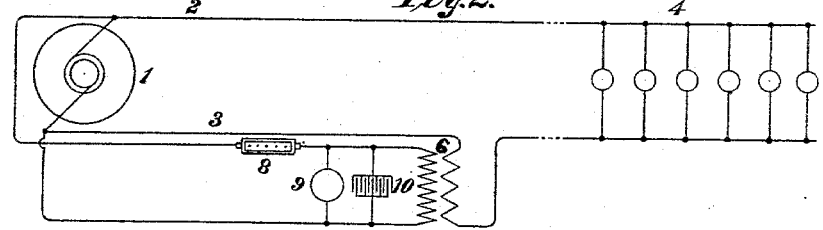
Figure 3:
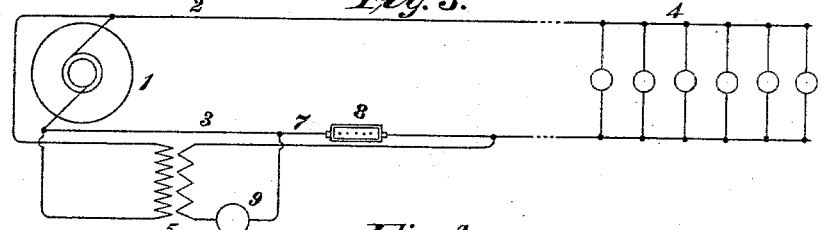
Figure 4:
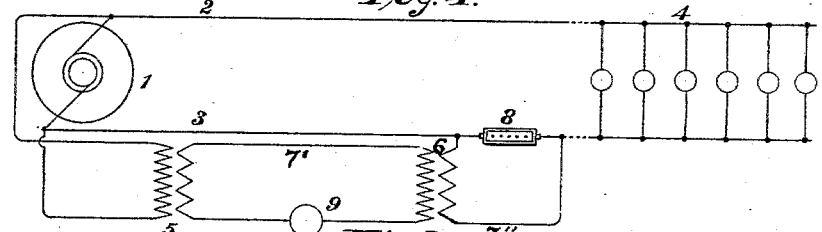

In the accompanying drawings, Figure 1 is a diagram of a distribution system embodying a form of my invention, in which both a shunt and a series-connected converter are employed. Fig. 2 is a similar diagram in which a series converter only is employed. Fig. 3 is a diagram showing a modification involving the use of a shunt-connected converter alone. Fig. 4 is a modification embodying two converters, and Fig. 5 a further modification in which a single shunt-converter is employed.

Referring in detail to the drawings, 1 is an alternating-current generator, and 2 and 3 the main-line circuit leading therefrom.

4 represents the load upon the main circuit, which may be of any character suited to the use of alternating electric currents.

5 is a converter the primary of which is in shunt to the main line, and 6 a second converter having its primary in series with the main-line circuit. The secondaries of these converters are included in a local circuit 7. Included in this local circuit is a resistance 8, which may be either inductive or non-inductive, according to the character of the load upon the main line. A voltmeter 9 and condenser 10 are connected across this circuit, as shown in the drawings. It is generally understood that the ampere-turns in the primary and secondary of a good converter are always very nearly equal to and in step with each other. It follows, therefore, that if the converters 5 and 6 are properly designed their primaries and secondaries will bear this relation. The current derived from the secondary of the latter will therefore be in step with the current in circuit 2 3 and the electromotive force at the terminals of the secondary of the former will be in step with that impressed upon the main line by the generator 1. The ratio of conversion may be anything desired, as is well understood.

The resistance 8 is shown in the drawings as adjustable in order to indicate that it may be adapted to different circuits, but for any one circuit it will be designed and adjusted once for all to represent a constant value and no change in its proportions or value will be at any time made for this particular circuit, since the resistance of the main line for any given circuit will remain constant. It is of course to be understood that any desired form of resistance suitable to the purpose may be employed, the illustrations given being merely conventional. It is also apparent that the shunt-converter may be so designed as to include in itself either a portion or all of the necessary resistance and the separate resistances be correspondingly modified or omitted altogether.

It is essential in this apparatus that the current in the local circuit, due to the electromotive force of the shunt-converter when there is no current in the main circuit, should be very small, and in most cases it probably will be so small that it need not be considered. Wherever it is necessary, however, the effect of this current may be annulled by including a condenser of properly-adjusted capacity in shunt to the series converter, as indicated at 11.

In the particular form of apparatus above described it will be borne in mind that the main-line generator electromotive force will be slightly augmented by the electromotive force projected through the converter 6 by the converter 5, and the resistance will be designed and its value adjusted accordingly.

It will be apparent from the foregoing description that any change in the potential in the work-circuit will be immediately indicated by the voltmeter 9, and that the electromotive force of the generator may be easily and readily regulated in accordance with the reading of the voltmeter in order to maintain the desired potential at the load.

In the modification shown in Fig. 2 the shunt-converter is dispensed with, the other apparatus remaining the same as in the form shown in Fig. 1. It is obvious that the several parts of the apparatus may be so designed as to obtain the desired results with this arrangement, although a step-down converter in circuit would, under most circumstances, probably be more desirable. It will be understood that with this arrangement of apparatus the electromotive force of the converter 6 exerted in the main line may be compensated for by properly designing the resistance 8.

In Fig. 3 the resistance 8 is included in the main line, that portion of the line in this modification forming a portion of the local circuit 7, which includes the voltmeter 9.

The operation of this modification and the results secured are substantially the same as those in the forms above described.

The arrangement of apparatus shown in Fig. 4 is substantially the same as in Fig. 3, except that a converter is included in the local circuit between the voltmeter and the resistance 8, thus forming substantially two local circuits 7' and 7'', the second of which contains the resistance and the primary of the converter 6, and the first the voltmeter and the secondaries of both converters 5 and 6. In this modification, and also in that shown in Fig. 3, the resistance 8, being included in the main line, constitutes a part of its resistance, and must therefore be taken into account in designing the apparatus in order that the ratios between the respective electromotive forces heretofore specified may be exactly secured.

Figure 5:
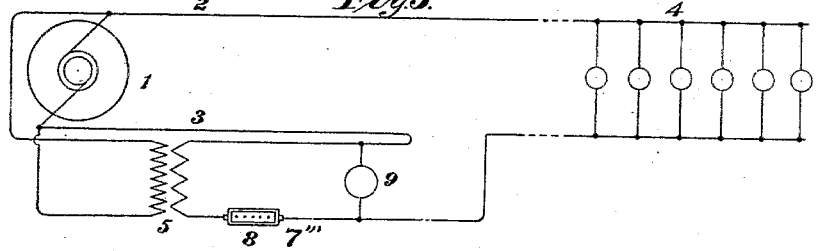

In Fig. 5 I have shown a single converter connected in shunt to the main line and a local circuit 7''', including the secondary of this converter 5, the resistance, and the voltmeter, said local circuit forming a part of the main line. In this modification the resistance may be partially or wholly included in the converter, as indicated in connection with the form shown in Fig. 1, if desired. In this modification, as well as in that shown in Fig. 1, it may be necessary in designing the resistance 8 to take into account a small increase in the electromotive force impressed upon the line by the generator due to that of the converter 5. It will also be understood that with any of the forms shown and described the shunt connection with the main line 2 3 might be made adjacent to the outer end of the local circuit instead of at the generator end.

It will be apparent from the foregoing description that whichever form of my invention be employed the miniature current will be proportional to and in step with the current in the main circuit and that this miniature current will bear the same relation to the miniature impressed electromotive force that the main-circuit current bears to the generator electromotive force impressed upon the main line. It follows, therefore, that the voltmeter 9, which indicates the value of the resultant of the compounded miniature impressed electromotive force and the miniature counter electromotive force, will indicate proportionally the value of the resultant of the compounded generator electromotive force and the counter electromotive force of the main circuit.

As the value of the main-circuit counter electromotive force and its relation to the generator electromotive force are changed by variations in the load, the resultant electromotive force will obviously be varied accordingly and its value will be immediately indicated by the voltmeter. If it is desired to maintain a constant potential at the load, it is therefore obviously necessary to so regulate the generator electromotive force as to maintain a constant reading of the voltmeter. In any event the potential at the load will be indicated at the generating-station, and the information thus afforded may be utilized as may be found necessary or desirable.

It will be understood that other modifications may be made by any one skilled in the art which will be within the spirit and scope of my invention, those illustrated and described being merely typical examples of modifications by which the desired results may be obtained.

I claim as my invention—

1. A station potential-indicator for alternating-current systems comprising a local circuit in which the impressed and counter electromotive forces of the main line are approximately reproduced in miniature, and a voltmeter for indicating the value of the resultant of these electromotive forces.

2. A station potential-indicator comprising a local circuit having a miniature counter electromotive force corresponding approximately in phase and amount to that of the main line, the respective ends of said local circuit having a shunt and a series connection with the main line, one or both of said connections being inductive, and means for indicating the potential at the load end of the main line, substantially as described.

3. A local circuit having the counter electromotive force of the line approximately represented in miniature, a series converter having its primary in the main circuit and its secondary in the local circuit, a condenser in shunt to said series converter, connections between the local and main circuits whereby an electromotive force is impressed upon the former which is proportional to that impressed upon the latter and means for indicating potential changes, substantially as described.

4. The method of determining the potential at the load in an alternating-current circuit which consists in producing and compounding two electromotive forces, one of which is proportional to and in step with the generator electromotive force and the other of which is approximately proportional to and in step with the resultant of the counter electromotive forces of the line itself, thereby producing a resultant electromotive force which is substantially proportional to and in step with that at the load, and indicating the value of said resultant electromotive force.

5. The combination with an alternating-current circuit, of a local circuit in which is approximately represented the resistance or the self-induction of the main line and having a current proportional to and in step with the main current, connections between the local and main circuits whereby the electromotive force impressed upon the former may be proportional to and in step with that impressed upon the latter, and a voltmeter for indicating the resultant electromotive force, substantially as described.

6. Potential-indicating apparatus for alternating-current systems comprising means for approximately reproducing locally in miniature the counter electromotive force and the impressed electromotive force of the main line, and a device for indicating the value of the resultant obtained by combining such electromotive forces.

In testimony whereof I have hereunto subscribed my name, this 21st day of December, A. D. 1895.

RALPH D. MERSHON.

Witnesses:
WESLEY G. CARR,
EDWIN S. CARPENTER.